(12) United States Patent
Yasuie et al.

(10) Patent No.: US 9,438,607 B2
(45) Date of Patent: Sep. 6, 2016

(54) INFORMATION PROCESSING APPARATUS AND VERIFICATION CONTROL METHOD

(71) Applicant: FUJITSU LIMITED, Kawasaki-shi, Kanagawa (JP)

(72) Inventors: Takeshi Yasuie, Kawasaki (JP); Taichi Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 256 days.

(21) Appl. No.: 14/221,454

(22) Filed: Mar. 21, 2014

(65) Prior Publication Data

US 2014/0297767 A1 Oct. 2, 2014

(30) Foreign Application Priority Data

Mar. 28, 2013 (JP) ................................. 2013-067791

(51) Int. Cl.
*H04L 29/06* (2006.01)

(52) U.S. Cl.
CPC ............. *H04L 63/12* (2013.01); *H04L 63/123* (2013.01)

(58) Field of Classification Search
CPC ............................. H04L 63/123; H04L 63/12
See application file for complete search history.

(56) References Cited

U.S. PATENT DOCUMENTS

| 8,914,675 B2 * | 12/2014 | Hatano | G06F 11/263 714/32 |
| 9,015,830 B2 * | 4/2015 | Yasuie | G06F 21/44 726/22 |
| 2011/0228684 A1 * | 9/2011 | Sugiyama | H04L 43/0811 370/252 |
| 2013/0246359 A1 * | 9/2013 | Sugiyama | G06F 17/30371 707/639 |

FOREIGN PATENT DOCUMENTS

| JP | 2009-301252 A | 12/2009 |
| JP | 2009301252 A | * 12/2009 |
| JP | 2010-113380 A | 5/2010 |
| JP | 2010113380 A | * 5/2010 |
| JP | 2010-205011 A | 9/2010 |
| JP | 2010205011 A | * 9/2010 |
| JP | 2011-199680 A | 10/2011 |

* cited by examiner

*Primary Examiner* — Michael C Lai
(74) *Attorney, Agent, or Firm* — Fujitsu Patent Center

(57) ABSTRACT

An information processing apparatus obtains a plurality of messages transmitted between a client and a server, each message including at least one of a plurality of parameters and a value of the parameter. The information processing apparatus detects a parameter having different values set in different messages among the obtained plurality of messages, from among the plurality of parameters. According to the detection result, the information processing apparatus determines a rewrite parameter whose value is rewritten when using the plurality of messages for verification of a server, among the plurality of parameters.

8 Claims, 15 Drawing Sheets

MESSAGE TABLE 124

| No | TIME | TRANSMISSION SOURCE ADDRESS | DESTINATION ADDRESS | METHOD/CODE | PATH | PARAMETER 1 | PARAMETER 2 |
|---|---|---|---|---|---|---|---|
| 1 | 13:00:00.000 | XX.2.1.100 | XX.1.1.10 | GET | /service | version=1.0 | — |
| 2 | 13:00:00.001 | XX.1.1.10 | XX.2.1.100 | 200 OK | — | auth_token=0fa5 | — |
| 3 | 13:00:00.021 | XX.2.1.100 | XX.1.1.10 | POST | /service/login | auth_token=0fa5 | user=Taro |
| 4 | 13:00:00.022 | XX.1.1.10 | XX.2.1.100 | 200 OK | — | — | — |
| 5 | 13:00:01.000 | XX.2.1.100 | XX.1.1.10 | GET | /service | version=1.0 | — |
| 6 | 13:00:01.001 | XX.1.1.10 | XX.2.1.100 | 200 OK | — | auth_token=3b2c | — |
| 7 | 13:00:01.021 | XX.2.1.100 | XX.1.1.10 | POST | /service/login | auth_token=3b2c | user=Taro |
| 8 | 13:00:01.022 | XX.1.1.10 | XX.2.1.100 | 200 OK | — | — | — |
| 9 | 13:00:02.000 | XX.2.1.105 | XX.1.1.10 | GET | /service | version=1.0 | — |
| 10 | 13:00:02.001 | XX.1.1.10 | XX.2.1.105 | 200 OK | — | auth_token=d97e | — |
| 11 | 13:00:02.021 | XX.2.1.105 | XX.1.1.10 | POST | /service/login | auth_token=d97e | user=Jiro |
| 12 | 13:00:02.022 | XX.1.1.10 | XX.2.1.105 | 200 OK | — | — | — |

FIG. 6

PARAMETER DETECTION TABLE 125

| CLIENT ADDRESS | PARAMETER NAME | VALUE |
|---|---|---|
| XX.2.1.100 | version | 1.0 |
| XX.2.1.100 | auth_token | 0fa5 |
| XX.2.1.100 | user | Taro |
| XX.2.1.105 | version | 1.0 |
| XX.2.1.105 | auth_token | d97e |
| XX.2.1.105 | user | Jiro |

FIG. 7

ANALYSIS RESULT TABLE 126

| DETERMINATION RESULT | PARAMETER NAME | REWRITING METHOD |
|---|---|---|
| DEPENDENT | auth_token | VALUE OF <input type="hidden" name="auth_token"> OF IMMEDIATELY PRECEDING RESPONSE MESSAGE |
| INDEPENDENT | version | — |

FIG. 8

ACTIVE SYSTEM
1  GET
2  200 OK
3  POST    para1=aaa
4  200 OK  para2=bbb
5  POST    para1=aaa; para2=bbb
6  200 OK
⇩ 
VERIFICATION SYSTEM
(1st TIME)
1   GET
2   200 OK
3   POST    para1=aaa
4a  200 OK  para2=ccc
5   POST    para1=aaa; para2=bbb
6a  500 Internal Server Error
⇩ 
VERIFICATION SYSTEM
(2nd TIME)
1   GET
2   200 OK
3   POST    para1=aaa
4b  200 OK  para2=ddd
5b  POST    para1=aaa; para2=ddd
6   200 OK
FIG. 11

MESSAGE TABLE                                    124

| No | METHOD/CODE | PARAMETER 1 | PARAMETER 2 |
|----|-------------|-------------|-------------|
| 1 | GET | version=1.0 | — |
| 2 | 200 OK | auth_token=0fa5 | — |
| 3 | POST | auth_token=0fa5 | user=Taro |
| 4 | 200 OK | — | — |
| 5 | GET | version=1.0 | — |
| 6 | 200 OK | auth_token=3b2c | — |
| 7 | POST | auth_token=3b2c | user=Taro |
| 8 | 200 OK | — | — |
| 9 | GET | version=1.0 | — |
| 10 | 200 OK | auth_token=d97e | — |
| 11 | POST | auth_token=d97e | user=Jiro |
| 12 | 200 OK | — | — |

→ PARAMETER ANALYSIS (REQUEST MESSAGE)

FIG. 12

INFORMATION PROCESSING APPARATUS AND VERIFICATION CONTROL METHOD

CROSS-REFERENCE TO RELATED APPLICATION

This application is based upon and claims the benefit of priority of the prior Japanese Patent Application No. 2013-067791, filed on Mar. 28, 2013, the entire contents of which are incorporated herein by reference.

FIELD

The embodiments discussed herein relate to an information processing apparatus and a verification control method.

BACKGROUND

It may be desired, in a process of operating or maintaining an information processing system, to verify whether or not a computer and another computer have the equivalent function. For example, there may be a case of verifying, before replacing a currently used computer with a new computer, whether or not the function of the original computer is also realized in the new computer. In addition, for example, a degradation test may be performed before updating software of a computer, in which the software is experimentally updated on a computer for testing to check whether or not operation of another software varies due to influence of the update. In addition, for example, when any failure occurs in a computer for business operation, there may be a case of reproducing the failure on a computer for debugging to analyze a cause of the failure.

As a computer to be verified, a server is conceivable, which receives a request message from a client and transmits a response message to the client according to the request message. The client and the server may be a physical computer (also referred to as a physical machine), or may be a virtual computer (also referred to as a virtual machine). In this case, a black-box verification method, which uses messages transmitted between a server and a client in the past to verify another server, may be employed as the verification method.

For example, a verification apparatus obtains a request message transmitted from a client to a server in the past and a response message transmitted from the server to the client in the past. The verification apparatus transmits the obtained past request message to another server and receives, from the other server, a response message to the request message. The verification apparatus then determines whether or not a function equivalent to that of the original server is realized in the other server by comparing the response message received from the other server with the obtained past response message.

There is proposed a test apparatus which evaluates the relative performance of a standby server with respect to an active server by capturing packets transmitted to and from the active server and transferring the captured packets to the standby server. In addition, there is proposed a test platform apparatus for testing a Web application in which a parameter name in a Web page provided to a client varies for each access from the client. The test platform apparatus preliminarily stores a parameter definition rule which defines a parameter whose name varies. The test platform apparatus extracts from a Web page a parameter which complies with the parameter definition rule, and substitutes the name and the value of the extracted parameter with a predetermined name and a predetermined value, thereby enabling an automatic test tool operating on the client to process the Web page.

Japanese Patent Laid-open Patent Publication No. 2011-199680

Japanese Patent Laid-open Patent Publication No. 2010-113380

Meanwhile, when a server and another server operate according to a value of a parameter included in a request message, directly using a request message transmitted between a client and a server in the past may result in incorrect verification of another server.

For example, the client may transmit, to the server, a request message including a value of a parameter which depends on a session such as a session ID or authentication information. In such a case, in response to transmission of the past request message without change to the other server, the other server may regard the value of the parameter as an abnormal value related to a non-existent session and return an error to the client. In addition, for example, the client may transmit a request message including a value of a parameter which depends on a physical state of the server, such as the MAC (Media Access Control) address of the server. Also in such a case, in response to transmission of the past request message without change to the other server, the other server may determine the value of the parameter to be inappropriate and return an error to the client.

Therefore, it is conceivable, when using messages transmitted between a server and a client in the past, to rewrite at least a part of the values of parameters included in the message. However, there is a problem that preliminarily defining, by a user instructing verification, a parameter whose value is to be rewritten among parameters that may be included in the messages imposes a large burden on the user. This is because it is difficult to accurately define a parameter whose value is to be rewritten, unless the user knows the details of the software that performs message processing.

SUMMARY

According to an aspect, there is provided an information processing apparatus including a memory configured to store a plurality of messages transmitted between a client and one or more servers, each message including at least one of a plurality of parameters and a value of the parameter, and a processor configured to detect, among the plurality of parameters, a parameter having different values set in different messages and, according to the detection result, determine a rewrite parameter whose value is rewritten when using the plurality of messages for verification of another server, among the plurality of parameters.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an exemplary message table;

FIG. 7 illustrates an exemplary parameter detection table;

FIG. 8 illustrates an exemplary analysis result table;

FIG. 11 illustrates an exemplary verification message;

FIG. 12 illustrates a first example of a message selection method;

DESCRIPTION OF EMBODIMENTS

Figure 1:
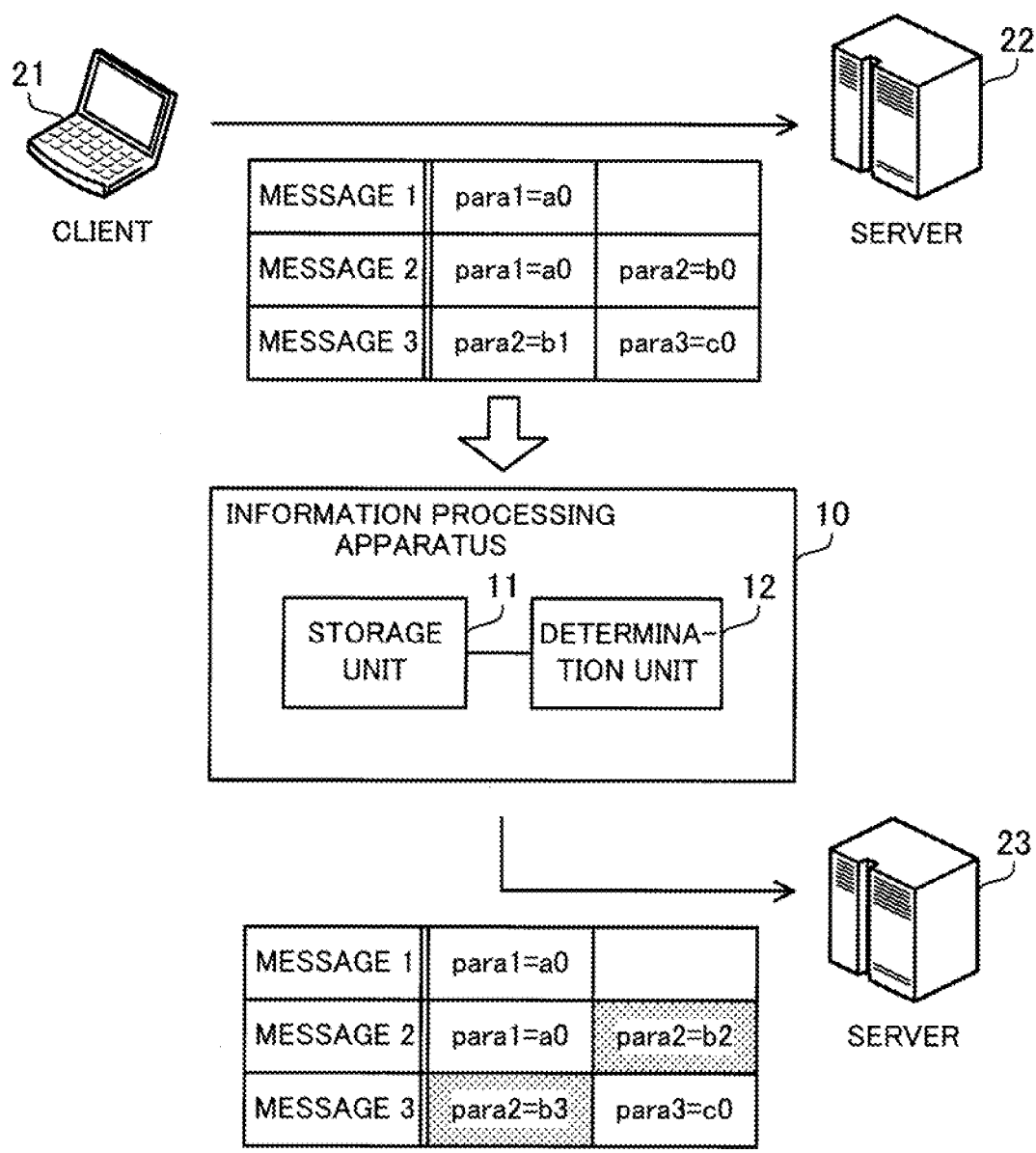
FIG. 1 illustrates an information processing system of a first embodiment.

Several embodiments will be described below with reference to the accompanying drawings, wherein like reference numerals refer to like elements throughout.

First Embodiment

FIG. 1 illustrates an information processing system of a first embodiment.

The information processing system of the first embodiment includes an information processing apparatus 10, a client 21, and servers 22 and 23. The information processing system uses messages transmitted between the client 21 and one or more servers including the server 22 to verify operation of one or more servers including the server 23. As the server 23, for example, there are conceivable a new server scheduled to replace the server 22, a server for testing, before updating software of the server 22, the operation after the update, a server for debugging for reproducing a failure occurred in the server 22 to analyze the cause thereof, or the like.

The client 21 and the servers 22 and 23 may be physical machines, or may be virtual machines. In the former case, for example, the information processing apparatus 10, the client 21 and the servers 22 and 23 are connected to a network having a communication apparatus such as a switch. In the latter case, two or more of the client 21 and the servers 22 and 23 may operate on the same physical machine. The physical machine on which a virtual machine operates may be the information processing apparatus 10.

The information processing apparatus 10 has a storage unit 11 and a determination unit 12. The storage unit 11 may be a volatile storage apparatus such as a RAM (Random Access Memory), or may be a nonvolatile storage apparatus such as an HDD (Hard Disk Drive). The determination unit 12 is realized using a processor, for example. The determination unit 12 may include a CPU (Central Processing Unit), a DSP (Digital Signal Processor), an ASIC (Application Specific Integrated Circuit), an FPGA (Field-Programmable Gate Array), and the like. When a processor is used, the processor executes a program to perform the procedure described below, for example.

The storage unit 11 stores a plurality of messages transmitted between the client 21 and one or more servers including the server 22. Each message includes at least one of a plurality of parameters and a value of the parameter. Messages to be stored in the storage unit 11 are collected, for example, by capturing, by the information processing apparatus 10, packets transmitted between the client 21 and the server 22. The messages to be collected may be limited to messages relating to a predetermined protocol such as the HTTP (Hypertext Transfer Protocol).

For example, the plurality of messages to be stored in the storage unit 11 includes messages 1 to 3 transmitted from the client 21 to the server 22. As a pair of a parameter name and a parameter value, the message 1 includes para1=a0, the message 2 includes para1=a0 and para2=b0, and the message 3 includes para2=b1 and para3=c0. In other words, para1 is included in the messages 1 and 2, with the value thereof being the same for the message 1 and the message 2. Although para2 is included in the messages 2 and 3, the value thereof is different between the message 2 and the message 3. Here, the parameters are application layer parameters such as those described in the HTTP header and the HTTP body, for example.

The determination unit 12 detects, from messages stored in the storage unit 11, a parameter having different values set in different messages among a plurality of parameters that may be included in the messages. The determination unit 12 then determines, according to the detection result, a rewrite parameter whose value is rewritten when using messages stored in the storage unit 11 for verification of the server 23 (or, a plurality of servers including the server 23). For example, the determination unit 12 determines, as the rewrite parameter, a parameter having different values set in different messages transmitted or received by the same client (the client 21). In the case of the above example, the determination unit 12 determines para2 as the rewrite parameter, among para1, para2 and para3.

The determination unit 12 may detect a parameter satisfying the condition described above, referring only to a request message (or referring preferentially to a request message) among a request message transmitted by the client 21 and a response message transmitted by the server 22. In addition, the determination unit 12 may detect a parameter satisfying the condition described above by referring to a plurality of messages stored in the storage unit 11 in a different order from the transmission order. For example, the determination unit 12 may perform a comparison of parameters included in messages which are separated from each other in terms of a transmission timing more preferentially than a comparison of parameters included in messages which are close to each other in terms of the transmission timing.

Subsequently, the value of the determined rewrite parameter is rewritten when verifying the server (or, a plurality of servers including the server 23). For example, para2 is determined as the rewrite parameter, whereas para1 and para3 are determined as non-rewrite parameters whose values are not rewritten. Accordingly, for example, the message 1 including para1=a0 is transmitted to the server 23, the message 2 including para1=a0 and para2=b2 is transmitted to the server 23, and the message 3 including para2=b3 and para3=c0 is transmitted to the server 23.

The value of a rewrite parameter (e.g., b2 or b3 described above) may be automatically calculated during the process of verifying the server 23. The determination unit 12 may determine the method of rewriting the value, based on a response message transmitted before a request message including the rewrite parameter (e.g., a response message immediately before the request message), among messages stored in the storage unit 11. In such a case, the value of a parameter of a request message transmitted to the server 23 thereafter is rewritten, based on the response message transmitted by the server 23 during the process of verification. Verification of the server 23 may be performed by the information processing apparatus 10 or another information processing apparatus.

According to the information processing system of the first embodiment, it is possible to determine a parameter whose value is to be rewritten, such as a parameter which depends on the session or a parameter which depends on the physical state of the server, from among parameters that may be included in a message. Therefore, when verifying the server 23 using messages transmitted between the client 21 and the server 22, it becomes possible to prevent incorrect verification due to parameter abnormality. In addition, the user need not preliminarily define the parameter whose value is to be rewritten and therefore the user need not know the details of the software to be executed on the server 23, and thereby the burden of the user is reduced.

Second Embodiment

Figure 2:
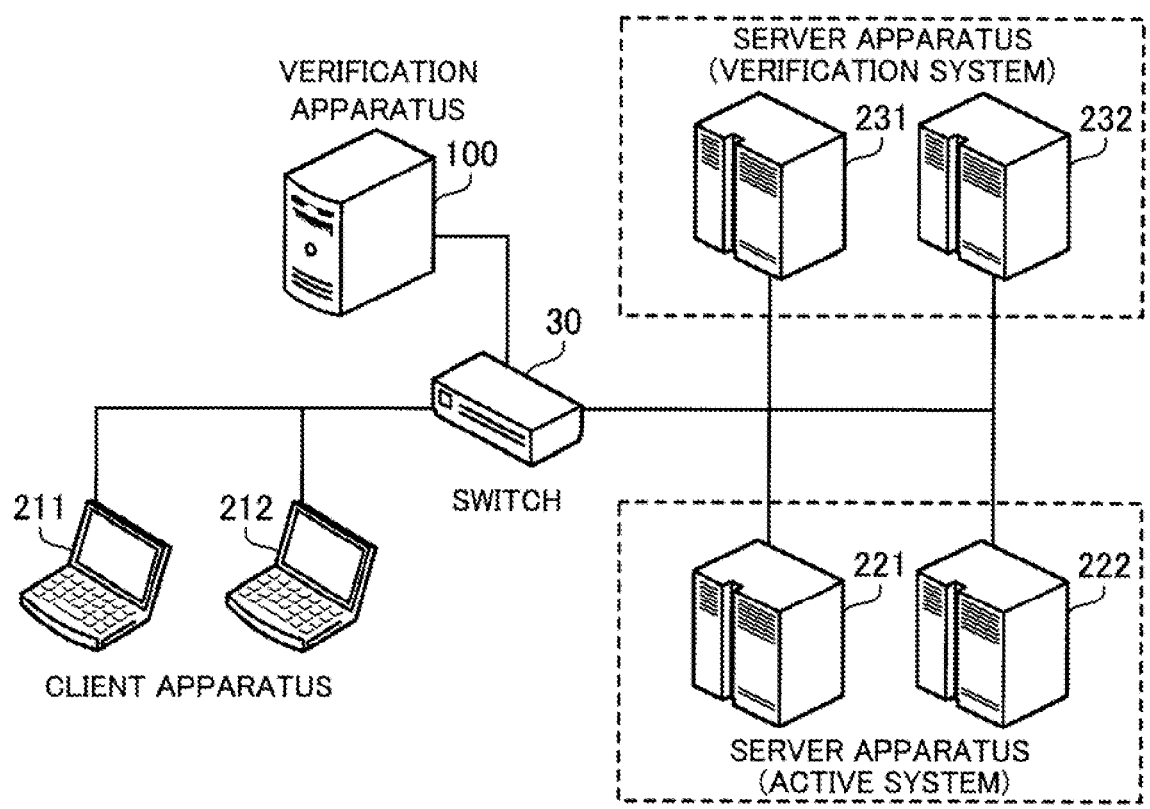
FIG. 2 illustrates an information processing system of a second embodiment.

FIG. 2 illustrates an information processing system of a second embodiment.

The information system of the second embodiment has a switch 30, a verification apparatus 100, client apparatuses 211 and 212, and server apparatuses 221, 222, 231 and 232.

The switch 30 is a communication apparatus which transfers packets. The switch 30 has a port mirroring function which copies packets passing through a particular normal port or all normal ports, and outputs the copied packets from a mirror port which is different from the normal port. The verification apparatus 100 is connected to the mirror port. The switch 30 copies packets transmitted between the client apparatuses 211 and 212 and the server apparatuses 221 and 222, and transmits the copied packets to the verification apparatus 100. As a method of capturing packets by the verification apparatus 100, the method may use a tap which copies a signal on a transmission medium in place of the switch 30.

The client apparatuses 211 and 212 are client computers each as a terminal apparatus operated by a user. The server apparatuses 221, 222, 231 and 232 are server computers, each configured to receive a request message, perform a process according to the request message, and return a response message. In the second embodiment, a Web server which performs HTTP communication is mainly assumed as the server apparatuses 221, 222, 231 and 232. However, the server apparatuses 221, 222, 231 and 232 may be other types of server computers.

The server apparatuses 221 and 222 among the above-mentioned server apparatuses are active server apparatuses which are currently used for business operation. The server apparatuses 221 and 222 receive a request message (e.g., HTTP request) from the client apparatuses 211 and 212, and transmit a response message (e.g., HTTP response) to the client apparatuses 211 and 212.

On the other hand, the server apparatuses 231 and 232 are verification server apparatuses which are not currently used for business operation. For example, as the server apparatuses 231 and 232, a server apparatus is conceivable which is scheduled to replace the server apparatuses 221 and 222 (to be used for business operation after system migration). In addition, for example, as the server apparatuses 231 and 232, a server apparatus for testing is conceivable which checks, before updating software of the server apparatuses 221 and 222, the operation after the update. In addition, for example, as the server apparatuses 231 and 232, a server apparatus for debugging is conceivable which analyzes failures occurred in the server apparatuses 221 and 222. The server apparatuses 231 and 232 receive a request message from the verification apparatus 100 and transmit a response message to the verification apparatus 100.

The verification apparatus 100 is a computer which verifies the server apparatuses 231 and 232 in a black-box manner, using messages transmitted between the client apparatuses 211 and 212 and the server apparatuses 221 and 222. The verification apparatus 100 may be a terminal apparatus operated by a user, or may be a server apparatus accessed from a terminal apparatus.

In verifying the server apparatuses 231 and 232, the verification apparatus 100 captures packets received from the switch 30, and extracts, from the captured packets, past messages (e.g., HTTP message) transmitted or received by the server apparatuses 221 and 222. The verification apparatus 100 transmits the extracted past request messages to the server apparatuses 231 and 232, and receives response messages from the server apparatuses 231 and 232. The verification apparatus 100 then compares the response messages received from the server apparatuses 231 and 232 with the past response messages, and thereby verifies whether or not the operation of the server apparatuses 231 and 232 observed from the client apparatuses 211 and 212 is equivalent to that of the server apparatuses 221 and 222.

However, a message transmitted between the client apparatuses 211 and 212 and the server apparatuses 221 and 222 may include a parameter which depends on the communication status such as a session-dependent parameter or a server-apparatus-dependent parameter. In response to transmission of the past request message without change including a communication-status-dependent parameter to the server apparatuses 231 and 232, the server apparatuses 231 and 232 may reject the request message, by determining the session or the server apparatus indicated by the value of the parameter to be inappropriate. Therefore, the verification apparatus 100 determines a status-dependent parameter from among parameters which may be included in the messages, and rewrites the value of the status-dependent parameter included in the request message as appropriate, according to the communication status with the server apparatuses 231 and 232.

Figure 3:
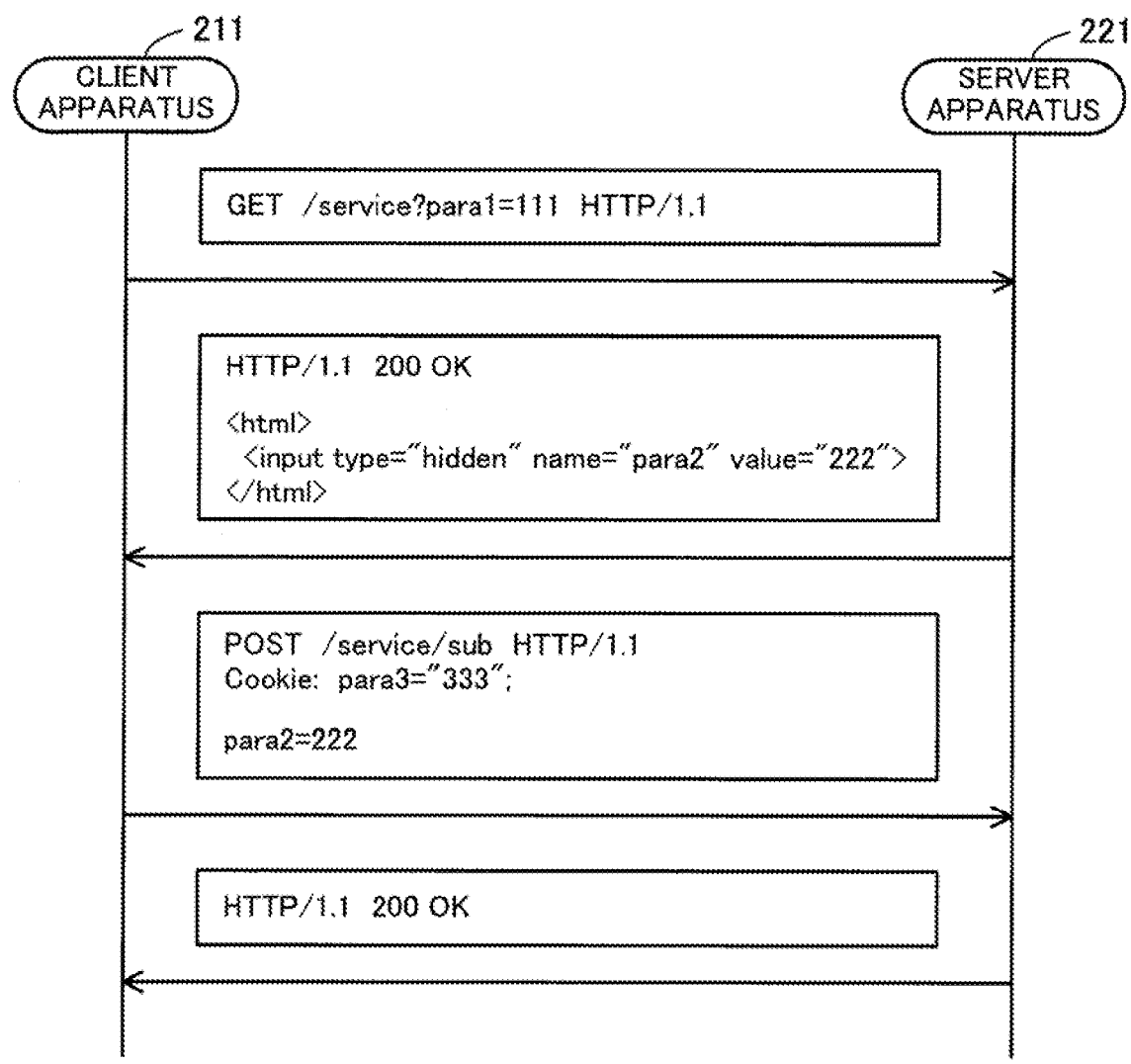
FIG. 3 illustrates exemplary parameters included in messages.

FIG. 3 illustrates exemplary parameters included in messages.

Here, consider a case where an HTTP message is transmitted between the client apparatus 211 and the server apparatus 221. The verification apparatus 100 determines a status-dependent parameter from among parameters included in the header and the body of the HTTP message.

The name and the value of the parameter may be added to the URL (Uniform Resource Locator) described in the header of the HTTP request. For example, when the URL has a description /service?para1=111, para1 is the parameter name and 111 is the value thereof. In addition, the name and the value of the parameter may be described as a Cookie in the header of the HTTP request. For example, when a Cookie has a description para3="333", para3 is the parameter name and 333 is the value thereof.

In addition, the name and the value of the parameter may be described as input data of the POST method in the body of the HTTP request. For example, when the input data has a description para2=222, para2 is the parameter name and 222 is the value thereof. In addition, the name and the value of the parameter may be included in the HTML (Hypertext Markup Language) tag described in the body of the HTTP response. For example, when the HTML tag has a description <input type="hidden" name="para2" value="222">, para2 is the parameter name and 222 is the value thereof.

The value of the parameter included in the HTTP response received by the client apparatus 211 before the HTTP request may be used as the value of the parameter included in the HTTP request transmitted by the client apparatus 211. For example, it is assumed that an HTTP response including para2=222 is transmitted to the client apparatus 211 from the server apparatus 221. In such a case, an HTTP request transmitted immediately thereafter from the client apparatus 211 to the server apparatus 221 may include para2=222.

As has been described above, the parameters may include a status-dependent parameter such as a session-dependent parameter or a server-apparatus-dependent parameter. A parameter indicating the session ID or authentication information may be cited as an example of a session-dependent parameter.

The session ID varies for each session as a general rule, and the authentication information varies, as a general rule, each time the server apparatus 221 performs authentication. For example, the server apparatus 221 transmits an HTTP response including a session ID to the client apparatus 211, and the client apparatus 211 transmits an HTTP request including the session ID to the server apparatus 221, which allows the server apparatus 221 to identify the session to which the HTTP request belongs. A physical address such as the MAC address may be cited as an example of a server-apparatus-dependent parameter. The value of the server-apparatus-dependent parameter varies according to the access destination server apparatus.

Figure 4:
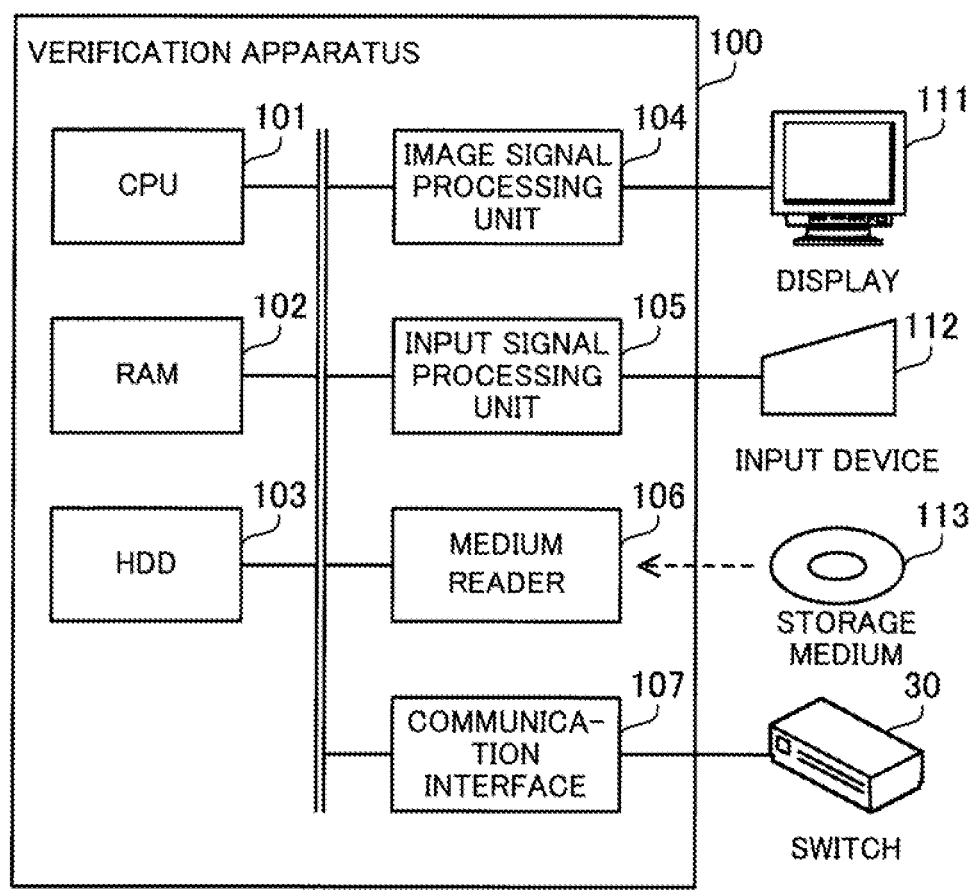
FIG. 4 is a block diagram illustrating an exemplary hardware of a verification apparatus.

FIG. 4 is a block diagram illustrating an exemplary hardware of the verification apparatus.

The verification apparatus 100 has a CPU 101, a RAM 102, an HDD 103, an image signal processing unit 104, an input signal processing unit 105, a medium reader 106, and a communication interface 107. The CPU 101 is an example of the determination unit 12 of the first embodiment, and the RAM 102 or the HDD 103 is an example of the storage unit 11 of the first embodiment.

The CPU 101 is a processor including an operational circuit which executes instructions of programs. The CPU 101 loads at least a part of a program and data stored in the HDD 103 into the RAM 102, and executes the program. The CPU 101 may include a plurality of processor cores and the verification apparatus 100 may include a plurality of processors, and accordingly the procedure described below may be performed in parallel using the plurality of processors or processor cores. In addition, a set of processors (multiprocessors) may be referred to as a "processor".

The RAM 102 is a volatile memory which temporarily stores programs executed by the CPU 101 or data which is used by the CPU 101 for calculation. The verification apparatus 100 may include any type of memory other than a RAM, and may include a plurality of memories.

The HDD 103 is a nonvolatile storage apparatus which stores software programs such as the OS (Operating System) and application software, and also stores data. The verification apparatus 100 may include another type of storage apparatus such as a flash memory or an SSD (Solid State Drive), and may include a plurality of nonvolatile storage apparatuses.

The image signal processing unit 104 outputs images to a display 111 connected to the verification apparatus 100, according to an instruction from the CPU 101. A CRT (Cathode Ray Tube) display, a liquid crystal display (LCD), a plasma display (PDP: Plasma Display Panel), an organic EL (OELD: Organic Electro-Luminescence) display, or the like may be used as the display 111.

The input signal processing unit 105 obtains an input signal from an input device 112 connected to the verification apparatus 100, and outputs the input signal to the CPU 101. A pointing device such as a mouse, touch panel, touchpad, or a track ball, a keyboard, a remote controller, a button switch, or the like may be used as the input device 112. In addition, a plurality of types of input devices may be connected to the verification apparatus 100.

The medium reader 106 is a drive unit which reads programs and data stored in a recording medium 113. A magnetic disk such as a flexible disk (FD) or an HDD, an optical disk such as a CD (Compact Disc) or a DVD (Digital Versatile Disc), an MO disk (Magneto-Optical disk), a semiconductor memory, for example, may be used as the recording medium 113. The medium reader 106 stores the programs or data which have been read from the recording medium 113, for example, in the RAM 102 or the HDD 103.

The communication interface 107 is an interface connected to the switch 30 to transmit and receive packets. The communication interface 107 receives, from the switch 30, a copy of packets transmitted between the client apparatuses 211 and 212 and the server apparatuses 221 and 222. In addition, the communication interface 107 transmits packets to the server apparatuses 231 and 232, and receives packets from the server apparatuses 231 and 232. The verification apparatus 100 may include a communication interface for capturing packets and, separately, a communication interface for communicating with the server apparatuses 231 and 232.

However, the verification apparatus 100 need not include the medium reader 106. In addition, the verification apparatus 100 need not include the image signal processing unit 104 and the input signal processing unit 105 when the verification apparatus 100 may be controlled from a terminal apparatus via a network.

Figure 5:
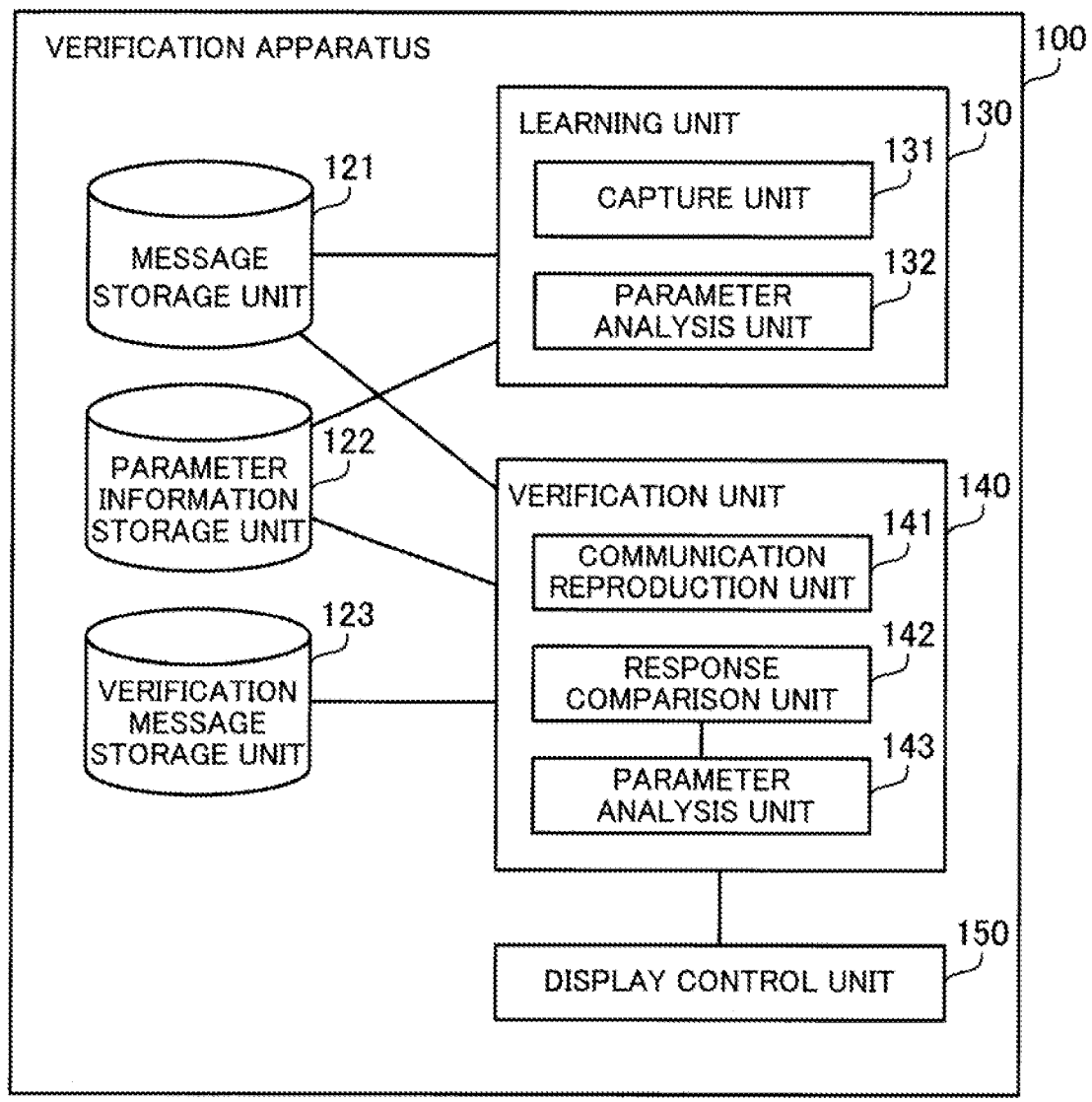
FIG. 5 is a block diagram illustrating an exemplary function of the verification apparatus.

FIG. 5 is a block diagram illustrating an exemplary function of the verification apparatus.

The verification apparatus 100 has a message storage unit 121, a parameter information storage unit 122, a verification message storage unit 123, a learning unit 130, a verification unit 140, and a display control unit 150. The message storage unit 121, the parameter information storage unit 122, and the verification message storage unit 123 may be realized as a storage area secured in the RAM 102 or the HDD 103, for example. The learning unit 130, the verification unit 140, and the display control unit 150 may be realized as a software module executed by the CPU 101, for example.

The message storage unit 121 stores messages or a part of information included in the messages transmitted between the client apparatuses 211 and 212 and the server apparatuses 221 and 222. The parameter information storage unit 122 stores an analysis result of parameters included in the messages and information of the intermediate progress of the analysis. The analysis result includes information indicating a status-dependent parameter, information indicating a status-independent parameter, and information indicating a method of rewriting the value of the status-dependent parameter at the time of verification. When verifying the server apparatuses 231 and 232, the verification message storage unit 123 stores messages or a part of information included in the messages transmitted between the verification apparatus 100 and the server apparatuses 231 and 232.

The learning unit 130 analyzes messages transmitted between the client apparatuses 211 and 212 and the server apparatuses 221 and 222, and learns a method of verifying the server apparatuses 231 and 232. The learning unit 130 has a capture unit 131 and a parameter analysis unit 132.

The capture unit 131 captures packets (e.g., IP (Internet Protocol) packets) received from the switch 30. When packets to be copied by the switch 30 include those transmitted by a computer other than the client apparatuses 211 and 212 and the server apparatuses 221 and 222, the capture unit 131 may limit the packets to be captured. The capture unit 131 then extracts messages from a set of captured packets and stores the messages or a part of information included in the messages in the message storage unit 121. In this occasion, the capture unit 131 may limit the messages to be extracted to those related to the protocol (e.g., HTTP) of a predetermined application layer.

Referring to the message storage unit 121, the parameter analysis unit 132 analyzes parameters included in messages, before verification of the server apparatuses 231 and 232 is started (static analysis). As will be described below, the parameter analysis unit 132 identifies three items: the client apparatus which transmitted or received the message, the parameter included in the message, and the value of the parameter. The parameter analysis unit 132 then determines the status-dependent parameter and the status-independent parameter, based on accordance or discordance of the above-mentioned three items among different messages. The parameter analysis unit 132 stores the analysis result in the parameter information storage unit 122.

The verification unit 140 verifies whether or not the operation of the server apparatuses 231 and 232 are equivalent to that of the server apparatuses 221 and 222, based on the learning result of the learning unit 130. The verification unit 140 has a communication reproduction unit 141, a response comparison unit 142, and a parameter analysis unit 143.

Referring to the message storage unit 121, the communication reproduction unit 141 reproduces, on the server apparatuses 231 and 232, the access from the client apparatuses 211 and 212 to the server apparatuses 221 and 222. In other words, the communication reproduction unit 141 transmits, to the server apparatuses 231 and 232, a request message transmitted from the client apparatuses 211 and 212 to the server apparatuses 221 and 222 in the past, with the transmission order being preserved. In this occasion, the communication reproduction unit 141 rewrites values of parameters included in the request message transmitted in the past as appropriate, based on the analysis result of parameters stored in the parameter information storage unit 122.

In the course of verification, the communication reproduction unit 141 stores, in the verification message storage unit 123, the request message or a part of information included in the request message transmitted to the server apparatuses 231 and 232. In addition, the communication reproduction unit 141 stores, in the verification message storage unit 123, the response message or a part of information included in the response message received from the server apparatuses 231 and 232 in response to the request message. However, it may be configured such that the request message or a part of information included in the request message is not stored in the verification message storage unit 123.

Referring to the message storage unit 121 and the verification message storage unit 123, the response comparison unit 142 compares the response message transmitted by the server apparatuses 221 and 222 in the past with the response message transmitted by the server apparatuses 231 and 232, and determines the equivalence of the both messages. When the two response messages are not equivalent, the response comparison unit 142 calls the parameter analysis unit 143.

In this occasion, the response messages may include session-dependent information or server-apparatus-dependent information, and therefore the response comparison unit 142 may determine that the two response messages are "equivalent" even when contents of the two response messages do not completely match. For example, the response comparison unit 142 determines that response messages having the same HTTP status code are equivalent. The HTTP status code is a code indicating the status of the server, such as a code 200 indicating the success of the HTTP request, a code 500 indicating the occurrence of an unexpected error in the server while processing an HTTP request. In addition, for example, the response comparison unit 142 determines that response messages are equivalent when similarity of character strings included in the body of the HTTP response is equal to or higher than a predetermined threshold value.

Referring to the verification message storage unit 123, the parameter analysis unit 143 analyzes, in the course of verification (dynamic analysis), parameters included in messages transmitted between the verification apparatus 100 and the server apparatuses 231 and 232. This is performed taking into account the possibility that not all the status-dependent parameters have been identified in the static analysis by the parameter analysis unit 132.

In other words, when it is determined that one response message received from the server apparatuses 231 and 232 is not equivalent to a past response message corresponding thereto, the parameter analysis unit 143 assumes that this is due to rewriting failure of the value of the parameter included in the request message. Under the assumption, the parameter analysis unit 143 estimates that the parameter included in the request message transmitted before the above-mentioned one response message is a status-dependent parameter (adds a status-dependent parameter), and updates the analysis result stored in the parameter information storage unit 122.

After the status-dependent parameter has been added, access to the server apparatuses 231 and 232 by the communication reproduction unit 141 is attempted again. When the response message received from the server apparatuses 231 and 232 is not equivalent to the past response message despite the addition of the status-dependent parameter, the parameter analysis unit 143 determines that there exists an anomaly in the server apparatuses 231 and 232, for example. In other words, it is determined that the operation of the server apparatuses 231 and 232 observed from the client apparatuses 211 and 212 is not equivalent to that of the server apparatuses 221 and 222.

However, before evaluating the equivalence of the operation of the server apparatuses 221 and 222 to the operation of the server apparatuses 231 and 232, the verification unit 140 may settle the status-dependent parameter first. For example, the verification unit 140 transmits a request message to the server apparatuses 231 and 232 which have executed the same software as that of the server apparatuses 221 and 222. The verification unit 140 keeps adding parameters estimated to be a status-dependent parameter until all the response messages being received in this occasion are equivalent to those transmitted from the server apparatuses 221 and 222 in the past. Subsequently, the verification unit 140 transmits a request message to the server apparatuses 231 and 232 which have executed software different from that of the server apparatuses 221 and 222 to evaluate the equivalence of operations.

The display control unit 150 causes the display 111 to display the verification result of the verification unit 140.

It is assumed in the second embodiment that the verification apparatus 100 includes both the learning unit 130 and the verification unit 140. In other words, it is assumed that the same physical machine performs both static analysis of the status-dependent parameter and verification of the server apparatuses 231 and 232. However, static analysis of the status-dependent parameter and verification of the server apparatuses 231 and 232 may be performed by different physical machines. In such a case, for example, the result of static analysis of the parameter performed by one of the physical machines is notified to the other physical machine which verifies the server apparatuses 231 and 232.

FIG. 6 illustrates an exemplary message table.

A message table 124 is a table stored in the message storage unit 121, the table having registered therein information about messages transmitted or received by the active server apparatuses 221 and 222. The message table 124 includes columns of message number, time, transmission source address, destination address, method or code, path, and a plurality of parameters. For the messages transmitted or received by the verification server apparatuses 231 and 232, a table of a structure similar to that of the message table 124 is stored in the verification message storage unit 123.

A message number is an identifier for identifying a message. Message numbers are provided by the capture unit 131 in chronological order of transmission timing, for example. The time column has an entry of the point of time when a packet including a message is captured in the verification apparatus 100. The transmission source address column has an entry of an identifier of a message transmission source, such as the transmission source IP address of the packet including the message. The destination address column has an entry of an identifier of a destination of a message such as the destination IP address of the packet including the message.

A method indicates the type of a request message, such as GET or POST specified in the header of an HTTP request. The POST method is mainly used when transmitting data which has been input to a form by a user, whereas the GET method is used when there is no such input data. A code indicates the type of a response message such as the HTTP status code. It is possible to check whether or not a request message has been normally processed by the server apparatuses 221 and 222 by referring to a code included in the response message.

The path column has an entry of an identifier of a Web resource (e.g., Web page) requested by the server apparatuses 221 and 222 such as the URL described in the header of the HTTP request. Each of the parameter columns has an entry of a pair of parameter name and value included in a message. There may exist a message including no parameter, a message including only one parameter, or a message including two or more parameters.

FIG. 7 illustrates an exemplary parameter detection table.

A parameter detection table 125 is generated while the parameter analysis unit 132 performs static analysis of a parameter, and is stored in the parameter information storage unit 122. The parameter detection table 125 includes columns of client address, parameter name, and value thereof.

A client address is the address (e.g., IP address) of a client apparatus which transmitted a request message or a client apparatus to be the destination of a response message. The client address corresponds to the transmission source address of the message table 124 for a request message, and corresponds to the destination address of the message table 124 for a response message. The parameter name column has an entry of an identifier of a parameter described in a message. The value column has an entry of the value of a parameter described in a message.

FIG. 8 illustrates an exemplary analysis result table.

An analysis result table 126 is stored in the parameter information storage unit 122. The analysis result table 126 includes columns of determination result, parameter name, and rewriting method.

The determination result column has "dependent" or "independent" described therein. "Dependent" indicates that a parameter is a status-dependent parameter whose value needs to be rewritten when verifying the server apparatuses 231 and 232. "Independent" indicates that a parameter is a status-independent parameter whose value needs not to be rewritten when verifying the server apparatuses 231 and 232.

The parameter name is similar to that entered in the parameter detection table 125. The rewriting method column has described therein a method of obtaining the value of a status-dependent parameter at the time of verification. There is no rewriting method described for a status-independent parameter. As a rewriting method, there is conceivable, for example, a method which searches for a particular tag from among response messages received from the server apparatuses 231 and 232 immediately before a request message including a status-dependent parameter and uses the value described in the tag as the value of the status-dependent parameter. Accordingly, an appropriate value according to the context of communication between the verification apparatus 100 and the server apparatuses 231 and 232 is set to the status-dependent parameter.

Not all the parameters appearing in the message table 124 are entered in the analysis result table 126. The parameter analysis unit 132 does not enter, in the analysis result table 126, a parameter which is unidentifiable to be either a status-dependent parameter or a status-independent parameter by static analysis. In such a case, the communication reproduction unit 141 handles a parameter which has not been identified as either a status-dependent parameter or a status-independent parameter, initially as a status-independent parameter. However, a part or all of such a parameter may be estimated to be a status-dependent parameter by dynamic analysis performed by the parameter analysis unit 143.

Next, procedure steps of the learning unit 130 and the verification unit 140 will be described.

Figure 9:
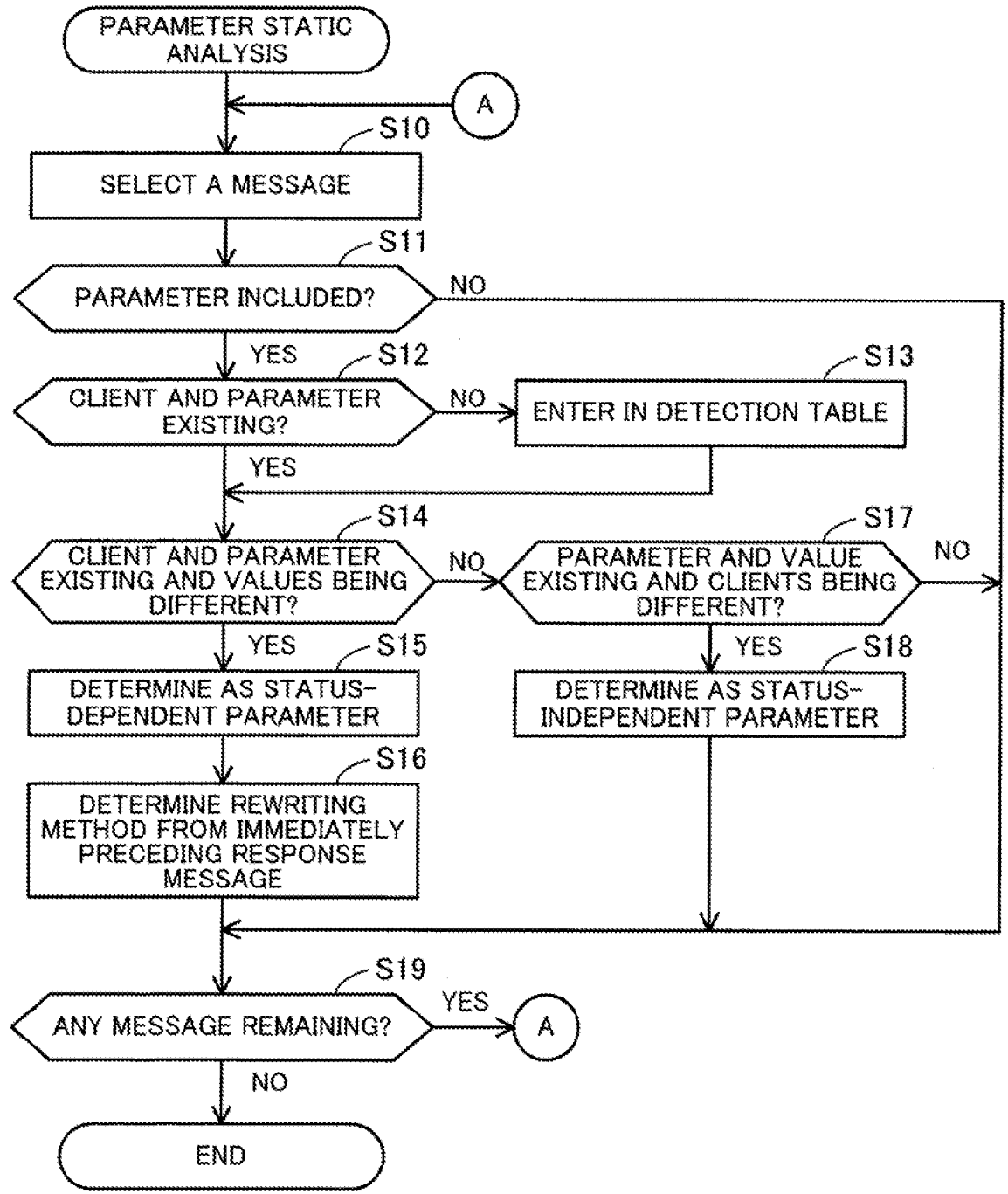
FIG. 9 is a flow chart illustrating an exemplary procedure of parameter static analysis.

FIG. 9 is a flow chart illustrating an exemplary procedure of parameter static analysis.

(S10) The parameter analysis unit 132 selects a message from the message table 124. As a general rule, messages are selected in ascending order of message numbers.

(S11) The parameter analysis unit 132 determines whether or not at least one parameter is included in the selected message. When at least one parameter is included in the message, the processing of the following steps S12 to S18 are performed for each parameter. When no parameter is included, the process flow proceeds to step S19.

(S12) The parameter analysis unit 132 determines whether or not a pair of the client address (target client address) of the selected message and the parameter name of the parameter included in the message (target parameter name) has already been entered in the parameter detection table 125. The process flow proceeds to step S14 when the pair has already been entered in the parameter detection table 125, or otherwise proceeds to step S13.

(S13) The parameter analysis unit 132 enters, in the parameter detection table 125, the target client address, the target parameter name, and the value of a parameter set in the selected message (target parameter value) in association with each other.

(S14) The parameter analysis unit 132 searches the parameter detection table 125 for an entry in which the pair of the client address and the parameter name matches the pair of the target client address and the target parameter name, with the value being different from the target parameter value. The process flow proceeds to step S15 when there exists a candidate entry, or otherwise proceeds to step S17.

(S15) The parameter analysis unit 132 determines the parameter indicated by the target parameter name to be a status-dependent parameter, and enters it in the analysis result table 126 in association with the determination result.

(S16) The parameter analysis unit 132 detects, from a response message immediately before the selected messages, a statement (e.g., an HTML tag) which specifies the target parameter name and sets the value thereof. The parameter analysis unit 132 then identifies a location where the value is set in the detected statement, and enters, in the analysis result table 126, the method of extracting the value from the location as the rewriting method. Subsequently, the process flow proceeds to step S19.

(S17) The parameter analysis unit 132 searches the parameter detection table 125 for an entry in which a pair of the parameter name and value matches the pair of the target parameter name and the target parameter value, with the client address being different from the target client address. The process flow proceeds to step S18 when there exists a candidate entry, or otherwise proceeds to step S19.

(S18) The parameter analysis unit 132 determines the parameter indicated by the target parameter name to be a status-independent parameter, and enters it in the analysis result table 126 in association with the determination result.

(S19) The parameter analysis unit 132 determines whether or not there remains an unselected message in the message table 124. When there exists an unselected message, the process flow proceeds to step S10 to process the next message (e.g., the message having the number incremented by one). When all the messages have been selected, static analysis of the parameter is completed.

As thus described, the parameter analysis unit 132 determines that a parameter having different values set in different messages transmitted or received by the same client apparatus is a status-dependent parameter. This is because when the same client apparatus sets different values for the same parameter, there is a high possibility that the parameter depends on the communication status of a session or the like. In addition, the parameter analysis unit 132 determines that a parameter having the same value set in different messages transmitted or received by different client apparatuses is a status-independent parameter. This is because when the different client apparatuses set the same value for a same parameter, there is a high possibility that the parameter does not depend on the communication status of a session or the like.

When determining a status-dependent parameter or a status-independent parameter, however, the parameter analysis unit 132 may request, in addition to equality of parameter name, equality of method or code, or equality of path. Accordingly, even when the same parameter name may be used for parameters having different meanings among Web pages of different paths, for example, it becomes possible to explicitly distinguish between such parameters having different meanings. In such a case, it suffices to add a column of method or code and a column of path to the parameter detection table 125.

Figure 10:
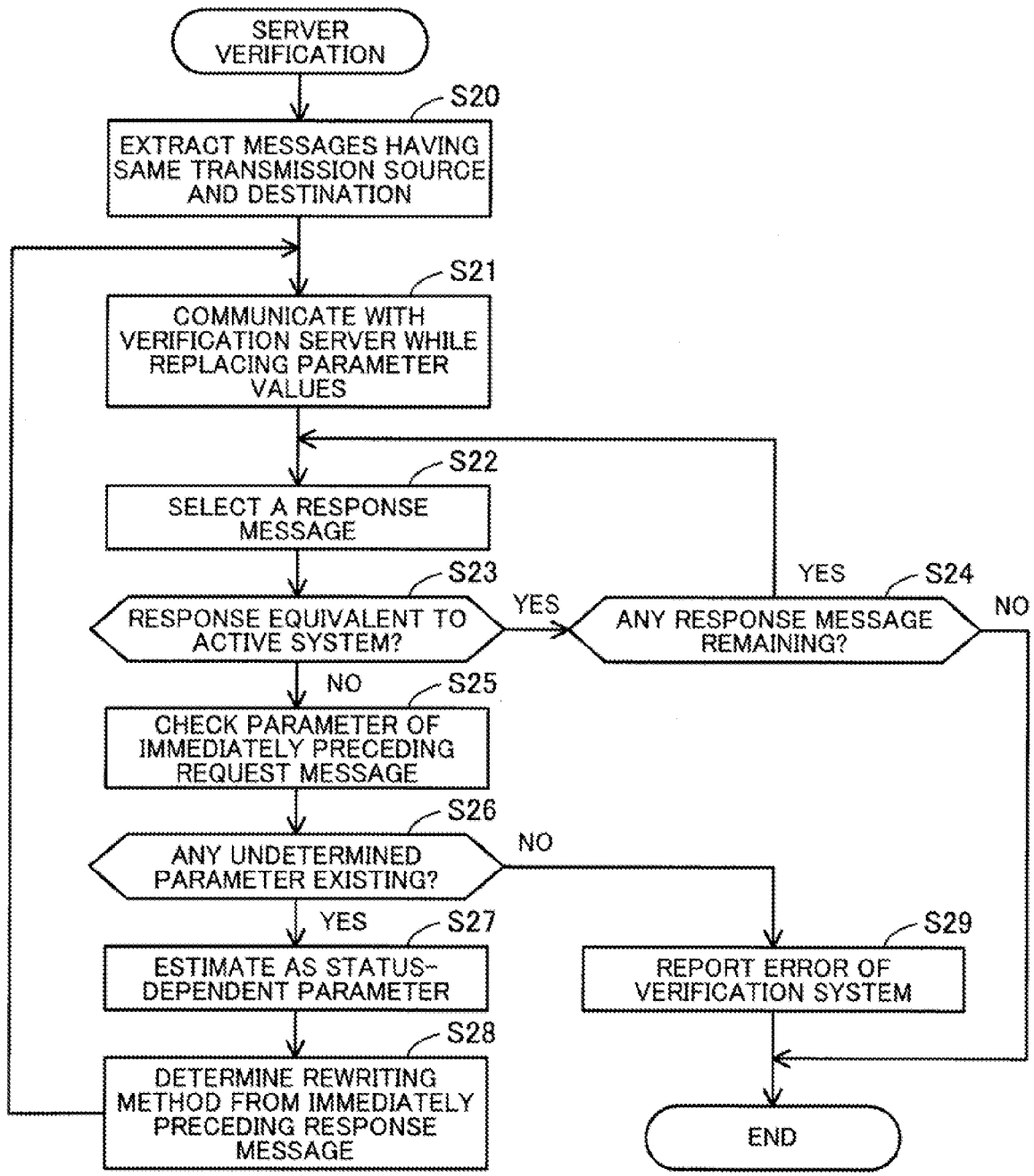
FIG. 10 is a flow chart illustrating an exemplary procedure of server verification.

FIG. 10 is a flow chart illustrating an exemplary procedure of server verification.

(S20) The communication reproduction unit 141 extracts, from the message storage unit 121, a list of messages (messages transmitted between a client apparatus and a server apparatus) having the same transmission source addresses and destination addresses. In the list, a plurality of messages is arranged in chronological order of transmission timing (e.g., in ascending order of message numbers).

(S21) The communication reproduction unit 141 selects one of the verification server apparatuses. The communication reproduction unit 141 then selects request messages from the list, one by one, in chronological order of transmission timing, and transmits the messages to the verification server apparatus. The next request message is transmitted after a response message for the preceding request message has been received. The communication reproduction unit 141 stores, in the verification message storage unit 123, the request message transmitted to the verification server apparatus and the response message (or, a part of information of each message) received from the verification server apparatus.

When transmitting a request message, the communication reproduction unit 141 determines whether or not a status-dependent parameter is included in the request message to be transmitted, referring to the analysis result table 126. When a status-dependent parameter is included, the communication reproduction unit 141 rewrites the value of the status-dependent parameter according to the rewriting method entered in the analysis result table 126, and transmits a request message after parameter rewriting to the verification server apparatus. For example, the communication reproduction unit 141 extracts the value of the status-dependent parameter from the response message received from the verification system server apparatus immediately before, and sets the value to the status-dependent parameter of the request message to be transmitted.

(S22) The response comparison unit 142 selects one of the response messages received from the verification server apparatus. The response messages are selected in chronological order of reception timing.

(S23) The response comparison unit 142 identifies, from the list of step S20, a response message of the active system corresponding to the selected response message of the verification system, and compares the response messages of the verification system and the active system. The response comparison unit 142 then determines whether or not the two response messages are equivalent. For example, the response comparison unit 142 determines the two response messages to be equivalent when the HTTP status codes are the same, and not equivalent when the HTTP status codes are different. The process flow proceeds to step S24 when the two response messages are equivalent, or otherwise proceeds to step S25.

(S24) The response comparison unit 142 determines whether or not there remains a message unselected at step S22 among the response messages received from the verification server apparatus. The process flow proceeds to step S22 when there exists an unselected message, or server verification is completed when all the messages have been selected. In the latter case, for example, the display control unit 150 causes the display 111 to display the verification result that the operation of the verification server apparatus is equivalent to that of the active server apparatuses 221 and 222.

(S25) The parameter analysis unit 143 detects, from the verification message storage unit 123, a request message transmitted to the verification server apparatus immediately before receiving the response message selected at step S22. The parameter analysis unit 143 then checks the parameter included in the detected request message. This request message may include no parameter, or may include two or more parameters.

(S26) The parameter analysis unit 143 determines whether or not there exists, in the set of parameters checked at step S25, a parameter which has not been identified to be either status-dependent or status-independent (a parameter which has not been entered in the analysis result table 126). The process flow proceeds to step S27 when there exists an undetermined parameter, or otherwise proceeds to step S29.

(S27) The parameter analysis unit 143 estimates the undetermined parameter to be a status-dependent parameter, and enters it in the analysis result table 126 in association with the determination result. When there are two or more undetermined parameters, the parameter analysis unit 143 may estimate all the undetermined parameters to be status-dependent parameters, or may estimate only an arbitrary one to be a status-dependent parameter.

(S28) The parameter analysis unit 143 searches for a response message received from the verification server apparatus immediately before the request message detected at step S25. The parameter analysis unit 143 then detects, from the detected response message, a statement which sets the value of the parameter estimated as a status-dependent parameter, determines the method of rewriting the value, and enters the method in the analysis result table 126. Subsequently, the process flow proceeds to step S21, where the communication reproduction unit 141 communicates with the verification server apparatus again, based on the updated analysis result table 126.

(S29) The display control unit 150 causes the display 111 to display a verification result (error) that the operation of the verification server apparatus is different from that of the active server apparatuses 221 and 222.

Comparison (S23) of the response messages of the verification system and the active system may be started after communication (S21) between the verification apparatus 100 and the verification server apparatus is completed, or may be started before completion thereof. In the latter case, when it is determined that the response message of a verification system is not equivalent to that of the active system, communication between the verification apparatus 100 and the verification server apparatus may be terminated on that time point.

FIG. 11 illustrates an exemplary verification message.

Here, it is assumed that messages #1 to #6 have been transmitted between the client apparatus 211 and the server apparatus 221. The message #1 is a request message. The message #2 is a response message with the code being 200 (normal). The message #3 is a request message and includes para1=aaa. The message #4 is a response message with the code being 200 and includes para2=bbb. The message #5 is a request message and includes para1=aaa and para2=bbb. The message #6 is a response message with the code being 200. In addition, it is assumed that para1 is determined to be a status-independent parameter by static analysis of the parameter analysis unit 132, and para2 is undetermined.

When verifying the server apparatus 231 using the messages #1 to #6, the communication reproduction unit 141 transmits a request message to the server apparatus 231 without converting the value of the parameter at the first time. For example, the communication reproduction unit 141 transmits the message #1 to the server apparatus 231 and receives the message #2 with the code being 200. In addition, the communication reproduction unit 141 transmits the message #3 including para1=aaa to the server apparatus 231, and receives the message #4a including para2=ccc with the code being 200. In addition, the communication reproduction unit 141 transmits the message #5 including para1=aaa and para2=bbb to the server apparatus 231, and receives the message #6a with the code being 500 (error).

The response messages to the message #1 have the same code in the active system and the verification system and therefore the response messages may be estimated to be equivalent. The response messages to the message #3 also have the same code in the active system and the verification system and therefore the response messages may be estimated to be equivalent. On the other hand, the response messages to the message #5 have different codes between the active system and the verification system and therefore the response messages may not be estimated to be equivalent (normal and error).

Therefore, the parameter analysis unit 143 extracts para2, which has not been determined yet, from the message #5 transmitted to the server apparatus 231 immediately before the message #6a which turned out to be an error, and estimates para2 to be a status-dependent parameter. In addition, the parameter analysis unit 143 determines the method of rewriting the value of the status-dependent parameter from the message #4a received from the server apparatus 231 immediately before the message #5. Here, the parameter analysis unit 143 determines that the value of para2 included in the message #4a needs to have been used in the message #5.

The communication reproduction unit 141 then transmits a request message to the server apparatus 231 while converting the value of para2 at the second time. For example, the communication reproduction unit 141 transmits the message #1 to the server apparatus 231 and receives the message #2 with the code being 200. In addition, the communication reproduction unit 141 transmits the message #3 including para1=aaa to the server apparatus 231 and receives the message #4b including para2=ddd with the code being 200. In addition, the communication reproduction unit 141 transmits the message #5b including para1=aaa and para2=ddd to the server apparatus 231, and receives the message #6a with the code being 200.

The messages #2, #4b, and #6 which are response messages of the verification system at the second time have the same codes as those of the messages #2, #4 and #6 of the active system, and therefore may be estimated to be equivalent. As thus described, para2 which has not been determined by static analysis of the parameter analysis unit 132 is estimated to be a status-dependent parameter by dynamic analysis of the parameter analysis unit 143. Accordingly, the mismatch of response messages due to inappropriately rewritten value of a session-dependent or a server-apparatus-dependent parameter may be removed in the course of communication with the verification server apparatus.

Next, a variation of static analysis performed by the parameter analysis unit 132 will be described. In the foregoing description, comparison of parameter names and values thereof between messages has been preferentially performed in ascending order of message numbers. In the variation described below, comparison is performed in a preference order different from the foregoing.

FIG. 12 illustrates a first example of the message selection method.

The parameter analysis unit 132 may select, from among the messages entered in the message table 124, a request message more preferentially than a response message, and extract a set of client address, parameter name and value. In addition, the parameter analysis unit 132 may extract a set of client address, parameter name and value only from a request message.

For example, the parameter analysis unit 132 extracts "version=1.0" from the request message having "number=1" and enters it in the parameter detection table 125. Next, skipping the response message having "number=2", the parameter analysis unit 132 extracts "authtoken=0fa5" and "user=Taro" from the request message having "number=3", and enters them in the parameter detection table 125. Next, the parameter analysis unit 132 skips the response message having "number=4" and extracts "version=1.0" from the request message having "number=5". Since the client address, and the parameter name and value are the same as existing ones, the parameter analysis unit 132 does not determine "version" to be either a status-dependent parameter or a status-independent parameter at this point.

Next, the parameter analysis unit 132 skips the response message having "number=6" and extracts "authtoken=3b2c" and "user=Taro" from the request message having "number=7". Although the client address and the parameter name for "auth_token" are the same as existing ones, the value thereof is different from the existing one. Therefore, the parameter analysis unit 132 determines "auth_token" to be a status-dependent parameter. The parameter analysis unit 132 does not determine "user" to be either a status-dependent parameter or a status-independent parameter at this point.

Next, the parameter analysis unit 132 skips the response message having "number=8" and extracts "version=1.0" from the request message having "number=9". Since the parameter name and value are the same as existing ones whereas the client address is different from the existing one, the parameter analysis unit 132 determines "version" to be a status-independent parameter. Next, the parameter analysis unit 132 skips the response message having "number=10" and extracts "authtoken=d97e" and "user=Jiro" from the request message having "number=11". The parameter analysis unit 132 does not determine "user" to be either a status-dependent parameter or a status-independent parameter.

As thus described, skipping response messages may reduce the number of messages to be processed. In addition, since the number of parameters included in a request message is usually smaller than the number of parameters included in a corresponding response message, the number of comparisons between parameters may be reduced. On the other hand, in terms of detecting a parameter whose value is to be rewritten when transmitting a request message to the server apparatuses 231 and 232, a parameter included in the request message are more important than a parameter included in the response message. Therefore, static analysis of parameters may be performed efficiently by selecting a request message preferentially.

After having processed a request message preferentially, the parameter analysis unit 132 may further process a response message. In this occasion, the parameter analysis unit 132 may allow a user to choose whether or not to continue the static analysis when having processed the request message, and may further process the response message when the user chooses to continue the static analysis. In addition, the parameter analysis unit 132 may process response messages in succession while the elapsed time from starting the static analysis to completing processing of request messages is equal to or less than a threshold value. Alternatively, the parameter analysis unit 132 may keep selecting messages until the elapsed time from starting the static analysis reaches a threshold value. Accordingly, the determination precision of a status-dependent parameter may be improved in a range where the processing time is not too long.

Next, another method of selecting messages will be further described.

Figure 13:
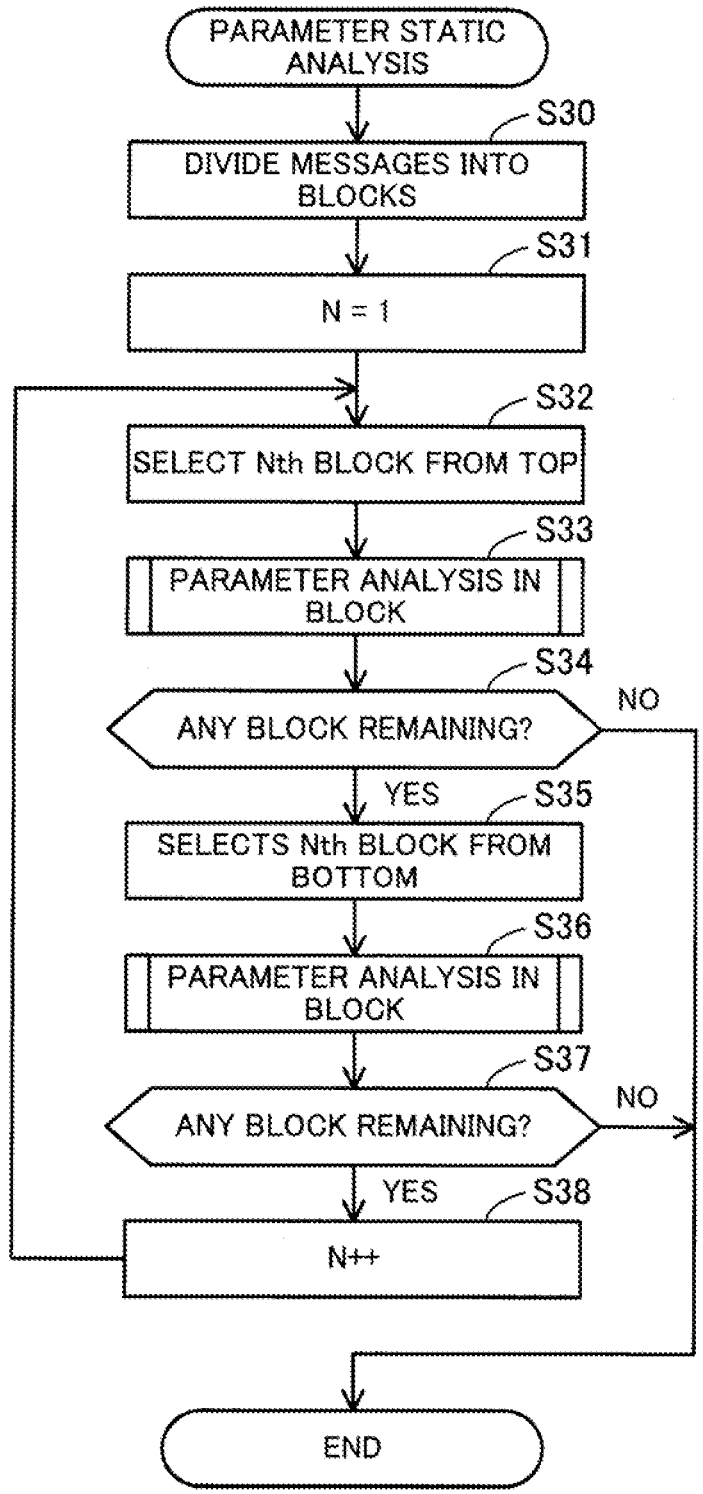
FIG. 13 is a flow chart illustrating another exemplary procedure of the parameter static analysis.

FIG. 13 is a flow chart illustrating another exemplary procedure of parameter static analysis.

(S30) The parameter analysis unit 132 divides the set of messages entered in the message table 124 into a plurality of blocks, maintaining the time sequence. For example, the parameter analysis unit 132, having preliminarily determined the number of messages per block (predetermined number), groups the messages by the predetermined number in chronological order of transmission timing.

(S31) The parameter analysis unit 132 initializes the block number N to 1.

(S32) The parameter analysis unit 132 selects, from the block column maintaining the time sequence, the Nth block from the top (Nth oldest transmission timing).

(S33) The parameter analysis unit 132 performs parameter static analysis illustrated in FIG. 9 in the block selected at step S32. For example, the parameter analysis unit 132 selects a message in the selected block in chronological order of transmission timing, and enters the extracted client address, parameter name and value in the parameter detection table 125.

(S34) The parameter analysis unit 132 determines whether or not there remains a block which has not yet been selected at step S32 or step S35 described below. The process flow proceeds to step S35 when there exists an unselected block, or otherwise the parameter static analysis is completed.

(S35) The parameter analysis unit 132 selects, from the block column maintaining the time sequence, the Nth block from the bottom (Nth newest transmission timing).

(S36) The parameter analysis unit 132 performs the parameter static analysis illustrated in FIG. 9 in the block selected at step S35. For example, the parameter analysis unit 132 selects a message in the selected block in chronological order of transmission timing, and enters the extracted client address, parameter name and value in the parameter detection table 125.

(S37) The parameter analysis unit 132 determines whether or not there remains a block which has not yet been selected at step S32 or step S35. The process flow proceeds to step S38 when there exists an unselected block, or otherwise the parameter static analysis is completed.

(S38) The parameter analysis unit 132 increments the block number N (adds one to the value), and the process flow proceeds to step S32. The parameter detection table 125 keeps being used without initialization while parameter analysis of steps S33 and S36 is being repeated. In other words, the set of client address, parameter name and value extracted in a block is to be compared with a set extracted in another block.

Figure 14:
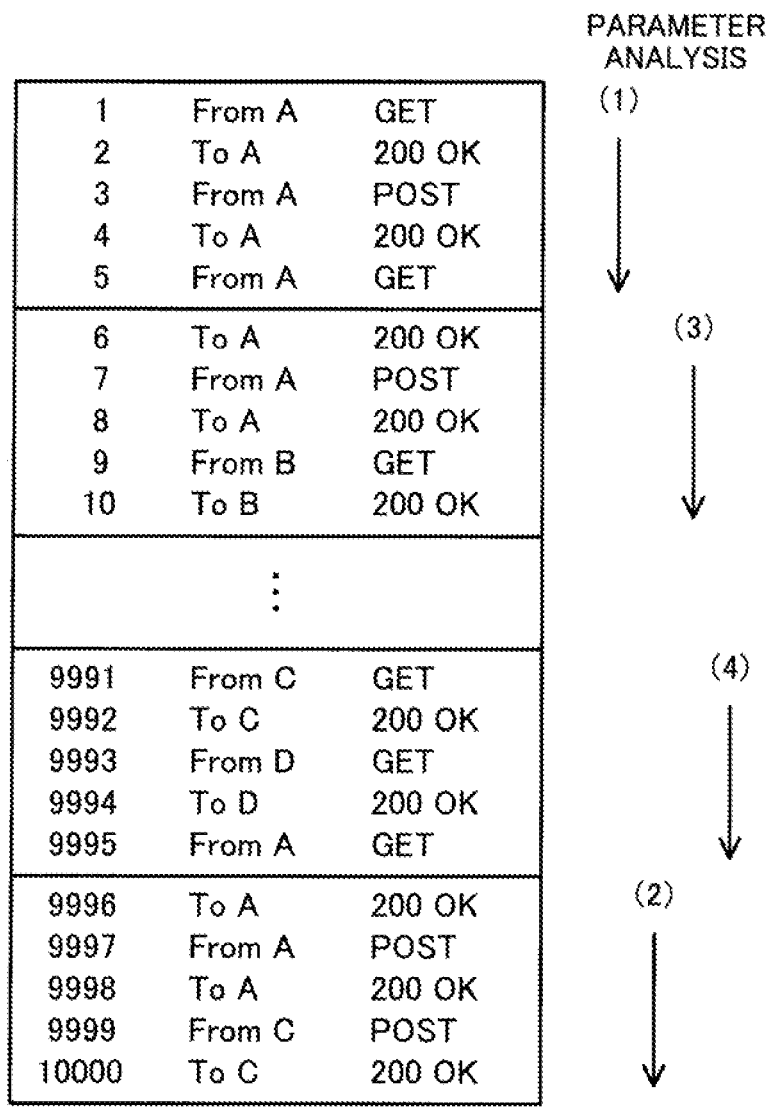
FIG. 14 illustrates a second example of the message selection method.

FIG. 14 illustrates a second example of the message selection method.

Here, 10,000 messages have been entered in the message table 124 and divided into 2000 blocks each including five messages. First, the parameter analysis unit 132 processes messages #1 to #5 belonging to the first block from the top. Next, the parameter analysis unit 132 processes messages #9996 to #10000 belonging to the first block from the bottom. Next, the parameter analysis unit 132 processes messages #6 to #10 belonging to the second block from the top. Next, the parameter analysis unit 132 processes messages #9991 to #9995 belonging to the second block from the bottom.

As thus described, the parameter analysis unit 132 may perform a comparison of parameters between temporally-separated messages more preferentially than a comparison of parameters between temporally-close messages. Here, values of session-dependent parameters are the same, as a general rule, between messages belonging to the same session. In addition, there is a high possibility that messages transmitted by the same client apparatus at close transmission timings belong to the same session. Therefore, the parameter analysis unit 132 may perform a comparison of parameters between messages belonging to different sessions at an early stage by selecting messages in the order described above, allowing efficient detection of session-dependent parameters.

According to the information processing system of the second embodiment, it is possible to automatically determine, from among parameters which may be included in a message, status-dependent parameters such as session-dependent parameters or server-apparatus-dependent parameters. Therefore, when verifying the verification server apparatuses 231 and 232, using messages transmitted between the client apparatuses 211 and 212 and the active server apparatuses 221 and 222, it becomes possible to prevent incorrect verification due to deficiency of parameter values. In addition, the user need not preliminarily define the status-dependent parameter whose value is to be rewritten and therefore the user need not know the details of the software to be executed on the server apparatuses 221, 222, 231 and 232, and thereby the burden of the user is reduced.

Third Embodiment

A third embodiment will be described. Difference from the aforementioned second embodiment will be mainly described, and description of items similar to those of the second embodiment will be omitted.

In the second embodiment, the verification apparatus 100, the client apparatuses 211 and 212, and the server apparatuses 221, 222, 231 and 232 are separate physical machines respectively connected to a network. However, it is also possible to virtualize two or more of the aforementioned computers and cause the two or more virtual machines to operate on the same physical machine. In the third embodiment, an example will be described in which virtual machines corresponding to the verification apparatus 100, the server apparatus 221 (active system), and the server apparatus 231 (verification system) operate on the same physical machine.

Figure 15:
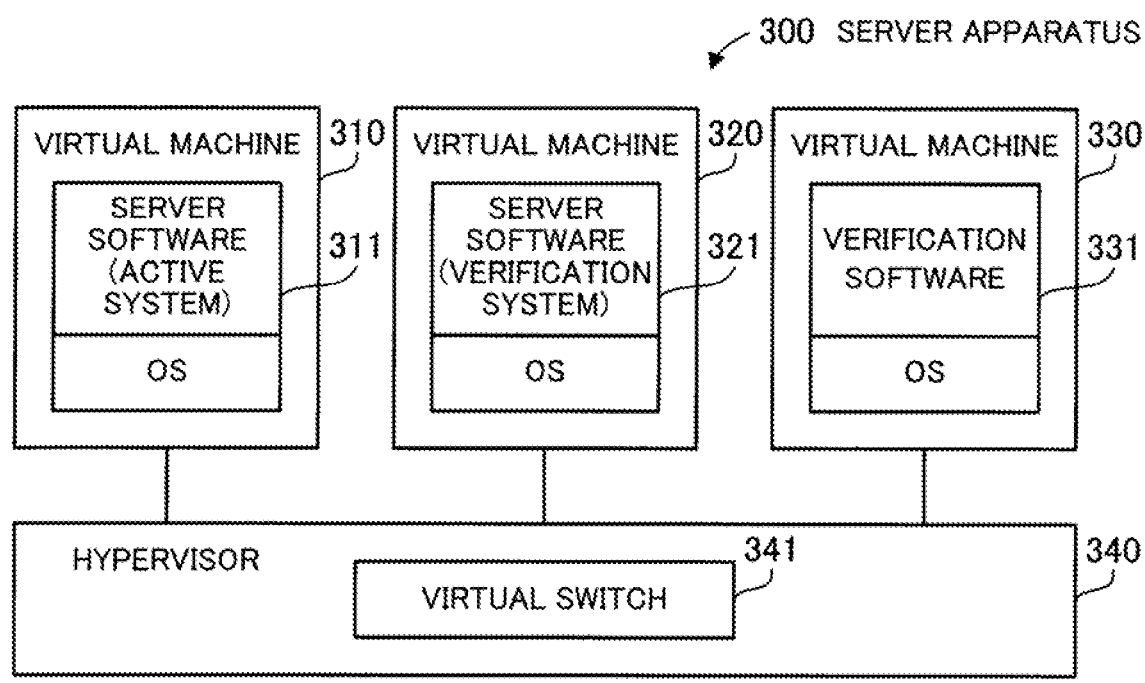
FIG. 15 is a block diagram illustrating another exemplary function of the server apparatus.

FIG. 15 is a block diagram illustrating another exemplary function of the server apparatuses.

A server apparatus 300 has virtual machines 310, 320 and 330, and a hypervisor 340. The virtual machines 310, 320 and 330, and the hypervisor 340 operate using a CPU and a RAM, for example. The virtual machine 310 corresponds to the server apparatus 221 of the second embodiment, and the virtual machine 320 corresponds to the server apparatus 231 of the second embodiment. The virtual machine 330 corresponds to the verification apparatus 100 of the second embodiment.

The virtual machine 310 executes the OS and server software 311 thereon. The server software 311 may be the same as the one being executed on the server apparatus 221. The virtual machine 320 executes the OS and server software 321 thereon. The server software 321 may be the same as the one being executed on the server apparatus 231. The virtual machine 330 executes the OS and verification software 331 thereon. The verification software 331 includes, for example, a module corresponding to the learning unit 130 and the verification unit 140.

The hypervisor 340 provides control so that a plurality of virtual machines operates in parallel. The hypervisor 340 allocates, to the virtual machines 310, 320 and 330, resources provided in the server apparatus 300 such as the number of CPU clocks or RAM areas. The OS operating on each virtual machine provides control so that the application software is executed on the virtual machine within the resources allocated by the hypervisor 340.

The hypervisor 340 has a virtual switch 341. The virtual switch 341 manages band resources of the communication interface provided in the server apparatus 300. In addition, the virtual switch 341 relays messages between the virtual machines 310, 320 and 330, and between a communication apparatus outside the server apparatus 300 and the virtual machines 310, 320 and 330. For example, the virtual switch 341 relays messages between the client apparatuses 211 and 212 and the virtual machine 310, and outputs copies of the messages to the virtual machine 330. In addition, the virtual switch 341 relays messages between the virtual machine 320 and the virtual machine 330.

According to the information processing system of the third embodiment, an effect similar to that of the second embodiment is brought about. Furthermore, in the third embodiment, it is possible to consolidate, using the computer virtualization technology, a plurality of computers having different functions on the same physical machine, thereby suppressing the management cost of the information processing system. In addition, collection of messages transmitted or received by the server software, or verification of the server software may be efficiently performed using a virtual machine.

As has been described above, information processing of the first embodiment may be realized by causing the information processing apparatus 10 to execute a program. In addition, the information processing of the second embodiment may be realized by causing the verification apparatus 100 to execute a program, and the information processing of the third embodiment may be realized by causing the server apparatus 300 to execute a program.

A program may be stored in a computer-readable recording medium (e.g., the recording medium 113). As a recording medium, a magnetic disk, an optical disk, an MO (Magneto-Optical) disk, a semiconductor memory or the like may be used, for example. The magnetic disk includes a floppy disk or an HDD. The optical disk includes a CD (compact disk), a CD-R (Recordable)/RW (Rewritable), a DVD or DVD-R/RW. A program may be stored in a portable recording medium for distribution. In such a case, the program may be copied (installed) on another recording medium such as an HDD (e.g., the HDD 103) from the portable recording medium for execution.

In one aspect, it becomes easy to verify a server, using a message related to another server.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
    a memory configured to store a plurality of messages transmitted from a client to a server, the plurality of messages including a first message and a second message, the first message including a name of a parameter and a first value of the parameter, the second message including the name of the parameter and a second value of the parameter; and
    a processor configured to perform a procedure including:
        comparing the first value and the second value and, according to a result of the comparing, determining whether the parameter is a status-dependent parameter whose value depends on a communication status between the client and the server; and
        when the parameter is a status-dependent parameter, rewriting the first value of the first message and the second value of the second message, and transmitting the rewritten first message and the rewritten second message to another server for verification of said another server.

2. The information processing apparatus according to claim 1, wherein
    the plurality of messages further includes a third message, the third message including the name of the parameter and a third value of the parameter;
    transmission of the third message from the client to the server is later than the first message and earlier than the second message; and
    the comparing between the first value and the second value is performed prior to a comparison between the first value and the third value.

3. The information processing apparatus according to claim 1, wherein when the first value and the second value are different, the parameter is determined as a status-dependent parameter.

4. The information processing apparatus according to claim 1, wherein
    the memory further stores a fourth message transmitted from another client to the server, the fourth message including the name of the parameter and a fourth value of the parameter, and
    the procedure further includes:
        comparing the first value and the fourth value and, when the first value and the fourth value are same, determining the parameter as a status-independent parameter whose value is independent from the communication status; and
        when the parameter is a status-independent parameter, transmitting the first message and the second message to said another server without rewriting the first value and the second value.

5. The information processing apparatus according to claim 1, wherein
    the memory further stores a response message transmitted from the server to the client, the response message including the name of the parameter and a fifth value of the parameter, and
    the comparing between the first value and the second value is performed prior to a comparison between the first value and the fifth value.

6. The information processing apparatus according to claim 5, wherein
    transmission of the response message from the server to the client is earlier than the second message; and
    the procedure further includes determining a method of rewriting the second value of the second message, based on the response message.

7. A verification control method comprising:
    obtaining, by a processor, a plurality of messages transmitted from a client to a server, the plurality of messages including a first message and a second message, the first message including a name of a parameter and a first value of the parameter, the second message including the name of the parameter and a second value of the parameter;
    comparing, by the processor, the first value and the second value and, according to a result of the comparing, determining whether the parameter is a status-dependent parameter whose value depends on a communication status between the client and the server; and
    when the parameter is a status-dependent parameter, rewriting, by the processor, the first value of the first message and the second value of the second message, and transmitting the rewritten first message and the rewritten second message to another server for verification of said another server.

8. A non-transitory computer-readable recording medium storing a computer program, wherein the computer program, when executed by a computer, causes the computer to perform a procedure comprising:
    obtaining a plurality of messages transmitted from a client to a server, the plurality of messages including a first message and a second message, the first message including a name of a parameter and a first value of the parameter, the second message including the name of the parameter and a second value of the parameter;
    comparing the first value and the second value and, according to a result of the comparing, determining whether the parameter is a status-dependent parameter whose value depends on a communication status between the client and the server; and
    when the parameter is a status-dependent parameter, rewriting the first value of the first message and the second value of the second message, and transmitting the rewritten first message and the rewritten second message to another server for verification of said another server.

* * * * *